United States Patent [19]

Hünger

[11] Patent Number: 4,555,568
[45] Date of Patent: Nov. 26, 1985

[54] MONOAZO COMPOUNDS DERIVED FROM 3-NITRO-4-AMINO-BENZOATES AND 5-(2'-HYDROXY-3'-NAPHTHOYLAMINO)-BENZIMIDAZOLONES

[75] Inventor: Klaüs Hünger, Kelkheim, Fed. Rep. of Germany

[73] Assignee: Hoechst Aktiengesellschaft, Frankfurt, Fed. Rep. of Germany

[21] Appl. No.: 162,074

[22] Filed: Jun. 23, 1980

[30] Foreign Application Priority Data

Jun. 25, 1979 [DE] Fed. Rep. of Germany ....... 2925542

[51] Int. Cl.⁴ ..................... C09B 29/01; C09B 29/15; D06P 1/44; D06P 3/24
[52] U.S. Cl. ..................... 534/801; 106/23; 106/288 Q; 106/308 Q; 106/309; 106/311; 526/219; 162/162
[58] Field of Search .......................... 260/157; 534/801

[56] References Cited

U.S. PATENT DOCUMENTS 3,124,565  3/1964  Schilling et al. ................ 260/157
4,182,708  1/1980  Landler et al. .................. 260/208

FOREIGN PATENT DOCUMENTS 1217008   5/1966   Fed. Rep. of Germany ...... 260/157
1808015   6/1970   Fed. Rep. of Germany ...... 260/157
1923256  11/1970   Fed. Rep. of Germany ...... 260/157
2823930  12/1978   Fed. Rep. of Germany ...... 260/157
1234668   6/1971   United Kingdom ............. 260/157
1238896   7/1971   United Kingdom ............. 260/157
1252166  11/1971   United Kingdom ............. 260/155

Primary Examiner—Floyd D. Higel
Attorney, Agent, or Firm—Curtis, Morris & Safford

[57] ABSTRACT

When diazotizing lower alkyl esters of 3-nitro-4-aminobenzoic acid and coupling them onto 5-(2'-hydroxy-3'-naphthoylamino)-benzimidazolone-(2) which may be substituted in 6'-position by chlorine or bromine, in 1-position by methyl or ethyl and in the benzo-nucleus by chlorine, bromine, methyl, ethyl, methoxy or ethoxy, and such as further illustrated by a representative formula

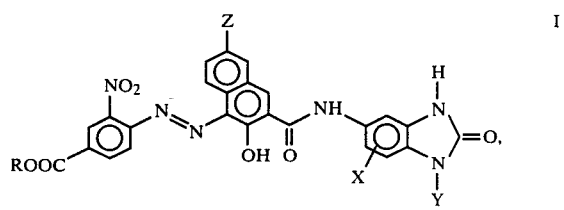

wherein R is alkyl of 1 to 4 carbon atoms, X is hydrogen, chlorine, bromine, methyl, ethyl, methoxy or ethoxy, Y is hydrogen, methyl or ethyl, and Z is hydrogen, chlorine or bromine. Colorants are obtained which are especially useful for pigmenting plastics, spinning masses, printing inks, varnishes and paints. The dyeings obtained therewith are fast to light, weathering, solvents and migration, especially fast to overvarnishing and bleeding.

2 Claims, No Drawings

MONOAZO COMPOUNDS DERIVED FROM 3-NITRO-4-AMINO-BENZOATES AND 5-(2'-HYDROXY-3'-NAPHTHOYLAMINO)-BENZIMIDAZOLONES

The present invention provides azo compounds of the formula I

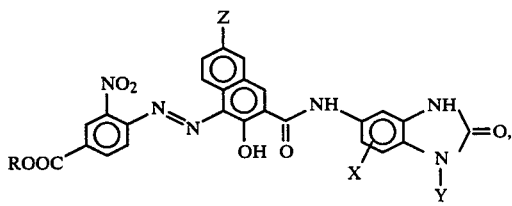

in which R is alkyl of from 1 to 4 carbon atoms, X is hydrogen, chlorine or bromine, methyl, ethyl, methoxy or ethoxy, Y is hydrogen, methyl or ethyl, and Z is hydrogen, bromine or chlorine.

The invention further relates to a process for the manufacture of the above-mentioned azo compounds, which comprises diazotizing compounds of the formula II

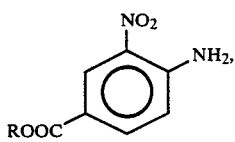

in which R is defined as above, and coupling the resulting diazonium compound with a compound of the formula III

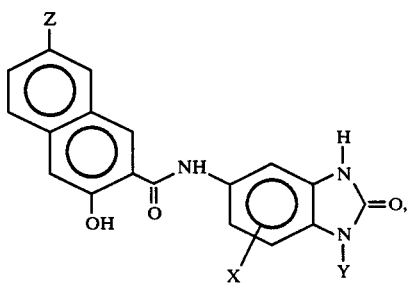

in which X, Y and Z are as defined for formula I above.

Another subject of the invention is the use of the azo compounds of the invention as colorants, especially as pigments.

Suitable amines of the formula II are, for example:
3-Nitro-4-aminobenzoic acid methyl ester
3-Nitro-4-aminobenzoic acid ethyl ester
3-Nitro-4-aminobenzoic acid-n-propyl ester
3-Nitro-4-aminobenzoic acid-isopropyl ester
3-Nitro-4-aminobenzoic acid-n-butyl ester
3-Nitro-4-aminobenzoic acid-isobutyl ester
3-Nitro-4-aminobenzoic acid-1'-methyl-propyl ester.

The amine of the formula II may be diazotized for example with alkali metal nitrites or lower alkyl nitrites with sufficiently strong acids, especially a mineral acid, but also with nitrosylsulfuric acid. In this process step as well as in the subsequent coupling it may be advantageous to add surface-active agents, such as non-ionic, anionic or cationic dispersing agents. The diazotization is suitably carried out at $-10°$ to $+30°$ C., and the coupling is effected at $0°$ to $40°$ C.

As coupling components there may be used, for example:
5-(2'-Hydroxy-3'-naphthoylamino)-benzimidazolone-(2)
5-(2'-Hydroxy-3'-naphthoylamino)-6-chlorobenzimidazolone-(2)
5-(2'-Hydroxy-3'-naphthoylamino)-7-chlorobenzimidazolone-(2)
5-(2'-Hydroxy-3'-naphthoylamino)-6-bromobenzimidazolone-(2)
5-(2'-Hydroxy-3'-naphthoylamino)-7-bromobenzimidazolone-(2)
5-(2'-Hydroxy-3'-naphthoylamino)-6-methyl benzimidazolone-(2)
5-(2'-Hydroxy-3'-naphthoylamino)-7-methyl benzimidazolone-(2)
5-(2'-Hydroxy-3'-naphthoylamino)-4-methyl benzimidazolone-(2)
5-(2'-Hydroxy-3'-naphthoylamino)-6-ethyl benzimidazolone-(2)
5-(2'-Hydroxy-3'-naphthoylamino)-6-methoxy benzimidazolone-(2)
5-(2'-Hydroxy-3'-naphthoylamino)-7-methoxy benzimidazolone-(2)
5-(2'-Hydroxy-3'-naphthoylamino)-6-ethoxy benzimidazolone-(2)
5-(2'-Hydroxy-3'-naphthoylamino)-7-ethoxy benzimidazolone-(2)
5-(2'-Hydroxy-3'-naphthoylamino)-1-methyl benzimidazolone-(2)
5-(2'-hydroxy-6'-bromo-3'-naphthoylamino)-benzimidazolone-(2).

The diazotization and coupling may also be carried out in the presence of suitable organic solvents, such as glacial acetic acid, lower alkanols, dioxan, formamide, dimethyl formamide, dimethyl sulfoxide, pyridine or N-methyl-pyrrolidone. In order to obtain the full tinctorial strength, it is often advantageous to heat the coupling mixture for some time, for example by boiling it or maintaining it under pressure at temperatures of more than $100°$ C., optionally in the presence of organic solvents, such as lower alkanols, for example ethanol or isobutanol, halogenated aromatic hydrocarbons, such as chlorobenzene or dichlorobenzenes, e.g. o-dichlorobenzene, dimethyl formamide, N-methyl pyrrolidone or in the presence of resin soap. Particularly pure pigments of high tinctorial strength are obtained with the products of the invention, if after coupling the moist press cakes or the dried powders are subjected to a thermal aftertreatment with organic solvents, such as alcohols, above all lower alkanols, pyridine, glacial acetic acid, dimethyl formamide, N-methyl pyrrolidone, dimethyl sulfoxide, halogenated aromatic hydrocarbons such as chlorobenzene or dichlorobenzenes, for example o-dichlorobenzene, or nitrobenzene, or if the pigments are subsequently ground with the addition of grinding auxiliaries.

The term "lower" relating to alkyl radicals includes groups of from 1 to 6, especially 1 to 4, carbon atoms.

The pigments may also be prepared in the presence of a carrier material, for example baryte.

The novel compounds are water-insoluble and insoluble in the common organic solvents and are suitable for pigmenting printing inks, varnishes and dispersion paints, for dyeing caoutchouc, plastics and natural or synthetic resins. They are especially suitable for varnishes, also metal effect lacquers, which are to meet particularly high fastness requirements.

They are further appropriate for the pigment printing on substrates, especially textile fiber materials or other flat articles, such as paper.

The pigments may also be used for other fields of application, for example in a finely divided form for the dyeing of rayon of viscose or cellulose ethers or esters, polyamides, polyurethanes, polyglycol terephthalates or polyacrylonitriles in the spinning mass, or for the dyeing of paper.

The pigments may be easily processed in the above-mentioned media. The dyeings show a very good fastness to light and weather and are resistant to the influence of chemicals, above all solvents. Besides, the pigments of the invention are marked by an unobjectionable fastness to overvarnishing in lacquers and fastness to bleeding in plastic materials.

As compared with the structurally closest compound (Example 51 of German Auslegeschrift No. 1,816,990), the pigments of the invention show markedly improved fastness properties to light, weathering and migration.

The following Examples illustrate the invention, the percentages relating to the weight.

EXAMPLE 1

10.5 Grams of 3-nitro-4-aminobenzoic acid ethyl ester are stirred for 1 hour at 10° C. in a mixture of 80 ml of glacial acetic acid and 15 ml of 31% hydrochloric acid. Thereafter 10 ml of 5N sodium nitrite solution are added dropwise, and stirring is continued for 30 minutes.

16 Grams of the sodium salt of 5-(2'-hydroxy-3'-naphthoylamino)-benzimidazolone-(2) are dissolved with 10 ml of 33% sodium hydroxide solution in a mixture of 750 ml of ethanol and 250 ml of water.

At about 10° C., the solutions of the diazo and coupling components are simultaneously added dropwise to a solution of 200 ml of ice water, 6 ml of glacial acetic acid, 25 ml of 4N sodium acetate solution and 10 ml of a 33% aqueous solution of a reaction product of oleyl alcohol and 30 mols of ethylene oxide. After coupling, the product is suction-filtered, washed with water until free from salt and dried. Thereafter the crude pigment is heated for 15 minutes at 140° C. in 500 ml of dimethyl formamide. The product is again filtered off with suction, washed with water and dried. Yield: 26.7 g of a reddish brown pigment of the formula

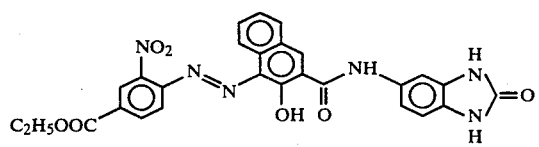

with a very good fastness to light and weather and an unobjectionable fastness to migration.

EXAMPLE 2

9.8 Grams of 3-nitro-4-aminobenzoic acid methyl ester are stirred for 1 hour in a mixture of 160 ml of glacial acetic acid and 30 ml of 31% hydrochloric acid. The mixture is thereafter cooled to 5° to 10° C. and diazotized by adding dropwise 10 ml of 5N sodium nitrite solution.

18.5 Grams of 5-(2'-hydroxy-3'-naphthoylamino)-7-chlorobenzimidazolone-(2) are dissolved with 10 ml of 33% sodium hydroxide solution in 75% aqueous ethanol. A mixture is prepared from 200 ml of ice water, 6 ml of glacial acetic acid, 25 ml of 4N sodium acetate solution and 10 ml of a 10% aqueous solution of a reaction product of stearyl alcohol and 30 mols of ethylene oxide. At 5° to 10° C., the solutions of the diazo and coupling components prepared as described above are simultaneously added dropwise. The components couple immediately. The reaction mixture is maintained for 1 hour at 95° C., the product is filtered off with suction while hot, washed until free from salt, and the crude pigment is dried. Subsequently the dry pigment is suspended in 600 ml of chlorobenzene and heated for 1 hour at 130° C. The product is filtered off with suction, while hot, washed with ethanol and water and dried.

There are obtained 26.9 g of a brownish red pigment of the formula

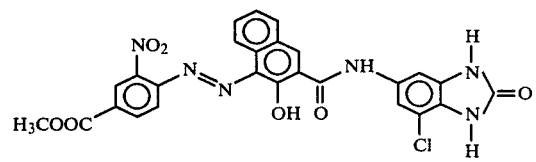

which shows a very good fastness to light and weather and an unobjectionable fastness to migration.

The following Table gives further Examples of azo compounds which are obtained by coupling the diazotized aromatic amines (diazo component) of the formula II with the coupling components of the formula III.

| Ex. No. | Formula II R | X | Formula III Y | Z | Shade |
|---|---|---|---|---|---|
| 3 | CH₃ | H | H | H | yellowish brown |
| 4 | CH₃ | 6-Cl | H | H | reddish brown |
| 5 | CH₃ | 6-Br | H | H | brown |
| 6 | CH₃ | 7-Br | H | H | brown |
| 7 | CH₃ | 6-CH₃ | H | H | brown |
| 8 | CH₃ | 7-CH₃ | H | H | brown |
| 9 | CH₃ | 4-CH₃ | H | H | yellowish brown |
| 10 | CH₃ | 6-OCH₃ | H | H | reddish brown |
| 11 | CH₃ | 7-OCH₃ | H | H | reddish brown |
| 12 | CH₃ | 6-OC₂H₅ | H | H | reddish brown |
| 13 | CH₃ | H | CH₃ | H | yellowish brown |
| 14 | CH₃ | H | H | Br | yellowish brown |
| 15 | C₂H₅ | 6-Cl | H | H | reddish brown |
| 16 | C₂H₅ | 7-Cl | H | H | reddish brown |
| 17 | C₂H₅ | 6-CH₃ | H | H | brown |
| 18 | C₂H₅ | 7-CH₃ | H | H | brown |
| 19 | C₂H₅ | 6-OCH₃ | H | H | reddish brown |
| 20 | C₂H₅ | 6-OC₂H₅ | H | H | reddish brown |
| 21 | n-C₃H₇ | H | H | H | yellowish brown |
| 22 | n-C₃H₇ | 7-Cl | H | H | reddish brown |
| 23 | n-C₃H₇ | 7-CH₃ | H | H | brown |
| 24 | iso-C₃H₇ | H | H | H | yellowish brown |
| 25 | iso-C₃H₇ | 7-Cl | H | H | brown |
| 26 | n-C₄H₉ | H | H | H | brown |
| 27 | n-C₄H₉ | 7-Cl | H | H | reddish brown |
| 28 | n-C₄H₉ | 7-CH₃ | H | H | brown |
| 29 | iso-C₄H₉ | H | H | H | brown |
| 30 | iso-C₄H₉ | 7-Cl | H | H | reddish brown |
| 31 | insert ring | H | H/ | H/ | brown |
| 32 | C₂H₅ | H | H | Br | yellowish brown |
| 33 | C₂H₅ | 7-C₂H₅ | H | H | yellowish brown |
| 34 | C₂H₅ | H | C₂H₅ | H | maroon |

I claim:
1. A compound of the formula

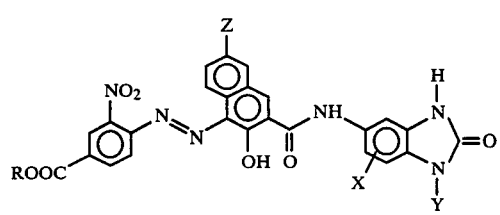
wherein R is ethyl and X, Y and Z are hydrogen.
2. A compound of the formula
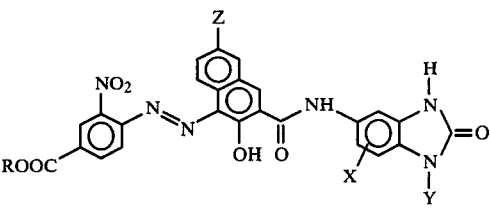
wherein R is methyl, X is methyl in 6-position and Y and Z are hydrogen.
* * * * *

UNITED STATES PATENT AND TRADEMARK OFFICE
CERTIFICATE OF CORRECTION

PATENT NO. : 4,555,568

DATED : November 26, 1985

INVENTOR(S) : Hunger

It is certified that error appears in the above-identified patent and that said Letters Patent is hereby corrected as shown below:

In Heading /19/ Inventor, "Hünger" should be --Hunger--

In Heading [75] Inventor, "Klaüs Hünger" should be
   --Klaus Hunger--;

Column 4, line 63, second column (the entry for the "R" substituent for Example 31), "insert ring" should be
--$C_2H_5-\underset{CH_3}{CH}-$ --.

Signed and Sealed this

Twenty-sixth Day of August 1986

[SEAL]

Attest:

DONALD J. QUIGG

Attesting Officer

Commissioner of Patents and Trademarks